United States Patent
Kashiwazaki et al.

Patent Number: 6,025,898
Date of Patent: Feb. 15, 2000

[54] COLOR FILTER MANUFACTURING METHOD IN WHICH THE INK DROPLET VOLUME V IS RELATED TO THE COLOR FILTER FILM THICKNESS D BY D>VO/500

[75] Inventors: Akio Kashiwazaki; Hiroshi Sato, both of Yokohama; Katsuhiro Shirota, Kawasaki; Hideto Yokoi, Yokohama; Takeshi Miyazaki, Ebina; Shoji Shiba, Sagamihara, all of Japan

[73] Assignee: Canon Kabushiki Kaisha, Tokyo, Japan

[21] Appl. No.: 08/999,959

[22] Filed: May 19, 1997

Related U.S. Application Data

[63] Continuation of application No. 08/443,422, May 18, 1995, abandoned.

[30] Foreign Application Priority Data

| May 20, 1994 | [JP] | Japan | 6-106824 |
| May 2, 1995 | [JP] | Japan | 7-108535 |
| May 16, 1995 | [JP] | Japan | 7-116767 |

[51] Int. Cl.$^7$ ............ G02F 1/1335; G02B 5/22; C08J 7/18; G03F 9/00
[52] U.S. Cl. ............ 349/106; 359/891; 427/165; 427/514; 430/7
[58] Field of Search ............ 347/46, 47, 56, 347/57, 61; 427/165, 466, 514; 359/68, 891; 430/7

[56] References Cited

U.S. PATENT DOCUMENTS

| 4,239,842 | 12/1980 | Sandhu | 430/7 |
| 4,313,124 | 1/1982 | Hara | 347/56 |
| 4,345,262 | 8/1982 | Shirato et al. | 347/56 |
| 4,459,600 | 7/1984 | Sato et al. | 347/66 |
| 4,463,359 | 7/1984 | Ayata et al. | 347/65 |
| 4,558,333 | 12/1985 | Sugitani et al. | 347/56 |
| 4,580,159 | 4/1986 | Manabe | 359/891 |
| 4,608,577 | 8/1986 | Hori | 347/47 |
| 4,723,129 | 2/1988 | Endo et al. | 347/10 |
| 4,740,796 | 4/1988 | Endo et al. | 347/57 |
| 4,969,718 | 11/1990 | Noguchi et al. | 359/68 |
| 5,035,928 | 7/1991 | Kozaki et al. | 359/59 |
| 5,281,450 | 1/1994 | Yaniv | 427/165 |
| 5,528,398 | 6/1996 | Suzuki et al. | 359/68 |
| 5,552,192 | 9/1996 | Kashiwazaki et al. | 427/165 |

FOREIGN PATENT DOCUMENTS

| 0431249 | 6/1991 | European Pat. Off. . |
| 54-056847 | 5/1979 | Japan . |
| 59-075205 | 4/1984 | Japan . |
| 59-123670 | 7/1984 | Japan . |
| 59-138461 | 8/1984 | Japan . |
| 60-071260 | 4/1985 | Japan . |
| 61-245106 | 10/1986 | Japan . |
| 62-282965 | 12/1987 | Japan . |
| 63-235901 | 9/1988 | Japan . |
| 63-294503 | 12/1988 | Japan . |
| 1-217302 | 8/1989 | Japan . |
| 1217320 | 8/1989 | Japan . |
| 2-173703 | 7/1990 | Japan . |
| 4123005 | 4/1992 | Japan . |
| 6-55743 | 3/1994 | Japan . |

OTHER PUBLICATIONS

English translation of Japanese Laid–Open Patent Application No. 61–245106.

*Primary Examiner*—William L. Sikes
*Assistant Examiner*—Walter Malinowski
*Attorney, Agent, or Firm*—Fitzpatrick, Cella, Harper & Scinto

[57] ABSTRACT

It is an object of the present invention to provide a color filter manufacturing method which can manufacture a low-cost color filter without causing any ink blurring, any color mixing, and any color omission. In order to achieve the object, according to the present invention, there is provided a color filter manufacturing method for a color filter formed by forming a layer to be colored on a transparent substrate, and discharging an ink colored in a predetermined color for coloring the layer, wherein when a numerical value of the thickness of the layer to be colored is assumed to be d ($\mu$m) and a numerical value of the volume of the ink discharged at one discharge is to be Vo (p1: pico-liter), the thickness of the layer to be colored and the volume of the ink are adjusted to establish d>Vo/500.

42 Claims, 11 Drawing Sheets

COLOR FILTER MANUFACTURING METHOD IN WHICH THE INK DROPLET VOLUME V IS RELATED TO THE COLOR FILTER FILM THICKNESS D BY D>VO/500

This application is a continuation of application Ser. No. 08/443,422 filed May 18, 1995, now abandoned.

BACKGROUND OF THE INVENTION

The present invention relates to a method of manufacturing a color filter by forming and arranging a plurality of colored filter elements on a transparent substrate, the color filter, a liquid crystal display apparatus, and an apparatus having the liquid crystal display apparatus.

With recent advances in personal computers, especially portable personal computers, the demand tends to arise for liquid crystal displays, especially color liquid crystal displays. However, in order to further popularize the use of liquid crystal displays, a reduction in cost must be achieved. Especially, it is required to reduce the cost of a color filter which occupies a large proportion of the total cost. Various methods have been tried to satisfy the required characteristics of color filters while meeting the above requirements. However, any method capable of satisfying all the requirements has not been established. The respective methods will be described below. The first method is a coloring method, which is the most popular method. In the coloring method, a water-soluble polymer material as a colorable material is coated on a glass substrate, and the coating is patterned into a desired shape by a photolithography process. The obtained pattern is dipped in a color bath to obtain a colored pattern. This process is repeated three times to form R, G, and B color filter layers.

The second method is a pigment dispersion method, which is currently replacing the coloring method. In this method, a pigment-dispersed photosensitive resin layer is formed on a substrate and patterned into a single-color pattern. This process is repeated three times to obtain R, G, and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Finally, these layers are calcined.

The fourth method is a method of dispersing a pigment in a thermosetting resin, performing a print operation three times to form R, G, and B coatings separately, and thermosetting the resins, thereby forming colored layers. In either of the above methods, a protective layer is generally formed on the colored layers.

The point common to these methods is that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, this method cannot be applied to TFTs. In the print method, a pattern with a fine pitch cannot be formed because of poor resolution and poor evenness.

In order to eliminate these drawbacks, methods of manufacturing color filters by an ink-jet system are disclosed in Japanese Patent Laid-Open Nos. 59-75205, 63-235901, 1-217320, and 4-123005.

The above manufacturing methods by the conventional ink-jet system cannot manufacture a satisfactory color filter in view of ink blurring, color mixing between adjacent filter elements, white omissions, and the like.

SUMMARY OF THE INVENTION

The present invention has been made in consideration of the above situation, and has as its object to provide a color filter manufacturing method which can manufacture a low-cost color filter without causing any ink blurring, any color mixing, and any color omission.

It is another object of the present invention to provide a color filter manufactured by the above manufacturing method, a liquid crystal display apparatus, and an apparatus having this liquid crystal display apparatus.

In order to solve the above problems and achieve the above objects, a color filter manufacturing method of the present invention is characterized by the following arrangement.

That is, there is provided a manufacturing method for a color filter formed by forming a layer to be colored on a transparent substrate, and discharging an ink colored in a predetermined color to the layer for coloring the layer, wherein when a thickness of the layer to be colored is assumed to be d ($\mu$m) and a volume of the ink discharged at one discharge is to be Vo (pl: pico-liter), the thickness of the layer to be colored and the volume of the ink are adjusted to establish d>Vo/500.

A color filter of the present invention is characterized by the following arrangement.

That is, there is provided a color filter formed by forming a layer to be colored on a transparent substrate, and discharging an ink colored in a predetermined color to the layer for coloring the layer, wherein when a thickness of the layer to be colored is assumed to be d ($\mu$m) and a volume of the ink discharged at one discharge is to be Vo (pl: pico-liter), the color filter is manufactured by adjusting the thickness of the layer to be colored and the volume of the ink so as to establish d>Vo/500.

A liquid crystal display apparatus of the present invention is characterized by the following arrangement.

That is, there is provided a liquid crystal display apparatus using a color filter formed by forming a layer to be colored on a transparent substrate, and discharging an ink colored in a predetermined color to the layer for coloring the layer, comprising: a color filter manufactured by adjusting a thickness of the layer to be colored and a volume of the ink to establish d>Vo/500 when the thickness of the layer to be colored is assumed to be d ($\mu$m) and the volume of the ink discharged at one discharge is to be Vo (pl: pico-liter); and a substrate opposing the color filter, wherein a liquid crystal compound is sealed between the substrates.

An apparatus having a liquid crystal display apparatus of the present invention is characterized by the following arrangement.

That is, there is provided an apparatus having a liquid crystal display apparatus using a color filter formed by forming a layer to be colored on a transparent substrate, and discharging an ink colored in a predetermined color to the layer for coloring the layer, comprising: a liquid crystal display apparatus having a color filter manufactured by adjusting a thickness of the layer to be colored and a volume of the ink to establish d>Vo/500 when the thickness of the layer to be colored is assumed to be d ($\mu$m) and the volume of the ink discharged at one discharge is to be Vo (pl:

pico-liter), and a substrate opposing the color filer, wherein a liquid crystal compound is sealed between the substrates; and image signal output means for outputting an image signal to the liquid crystal display apparatus.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

The preferred embodiment of the present invention will be described in detail below with reference to the accompanying drawings.

Figure 1A:
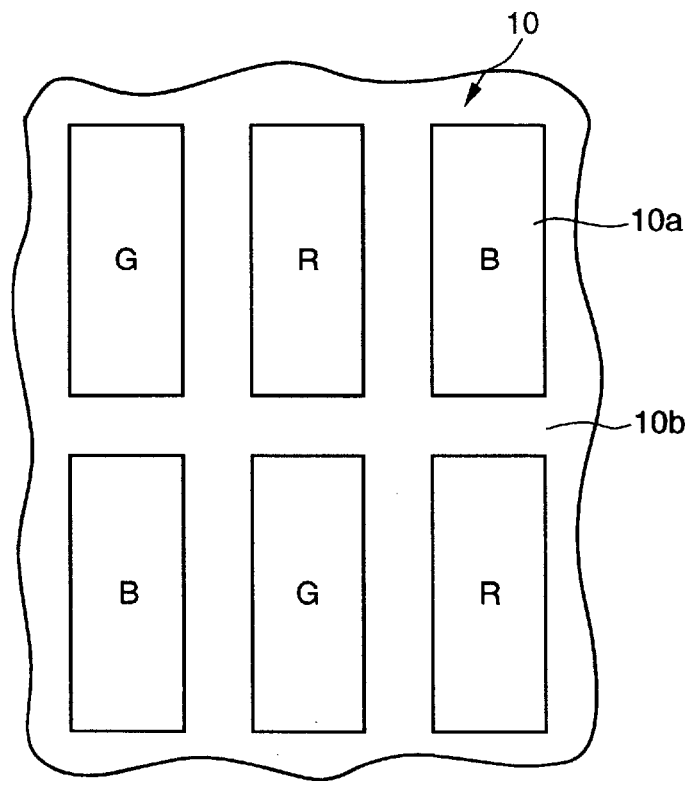
FIGS. 1A and 1B are partial enlarged views showing color filters manufactured by a manufacturing method and apparatus according to the present invention.
Figure 1B:
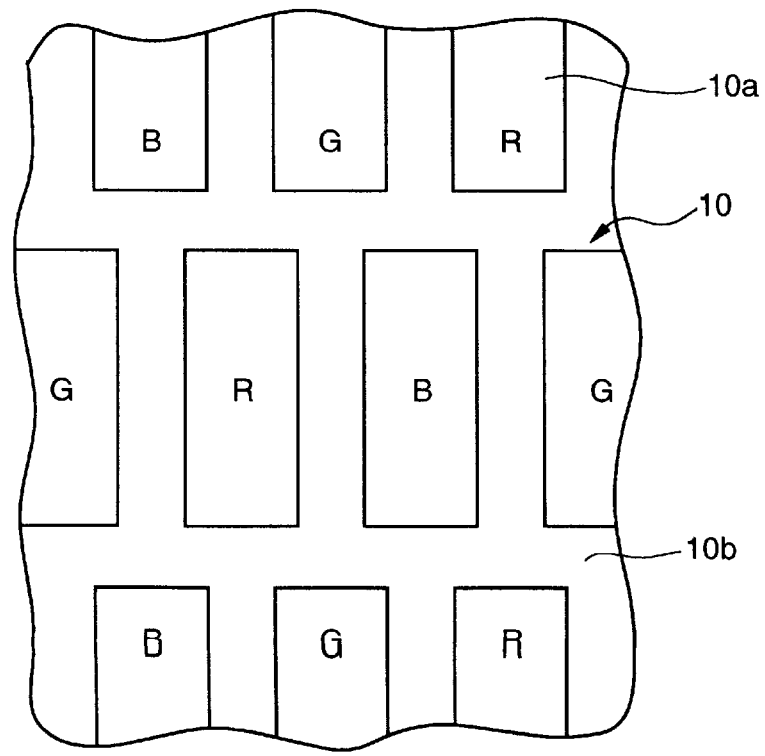

FIGS. 1A and 1B are partial enlarged views of color filters manufactured by a manufacturing method according to the present invention.

Each color filter 10 is mounted on the front surface of a color liquid crystal display or the like used for a portable personal computer or the like. As shown in FIGS. 1A and 1B, filter elements 10a colored in R (red), G (green), and B (blue) are two-dimensionally arranged in a matrix form. In the color filter shown in FIG. 1A, the filter elements 10a are arranged in a simple matrix form. In the color filter shown in FIG. 1B, the filter elements 10a are arranged in a staggered form. A black light-shielding grating 10b is formed between the respective filter elements 10a to make the boundaries between the filter elements 10a clear so as to provide a clear screen. Note that according to the embodiment, each filter element is formed in a rectangular shape having shorter sides of 50 to 100 $\mu$m and longer sides of 150 to 450 $\mu$m.

Figure 2:
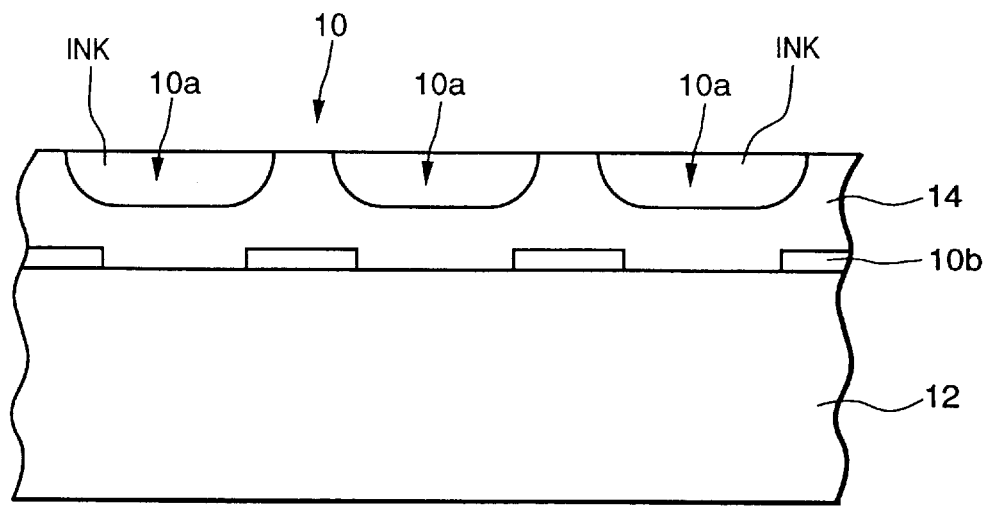
FIG. 2 is a side sectional view showing the color filter in FIG. 1A or 1B.

FIG. 2 is a side sectional view of the color filter 10 in FIG. 1A or 1B. The light-shielding grating 10b is formed on a glass substrate 12 constituting the main body of the color filter 10. The filter elements 10a of the respective colors are formed on the light-shielding grating 10b.

In manufacturing the color filter 10, chromium is deposited on the glass substrate 12 by sputtering, and the resultant film is formed into a matrix pattern by photolithography. This pattern is the light-shielding grating 10b. A layer 14 to be colored is formed on the light-shielding grating 10b. The layer 14 consists of a cellulose, an acrylic resin, gelatin, or the like and absorbs a fluid. Droplets (to be referred to as an ink hereinafter) containing a coloring material (dye) are sprayed on the filter element formation regions of the layer 14 by a recording head of the ink-jet system. With this process, the layer 14 is colored to form the color filter elements 10a.

Figure 10:
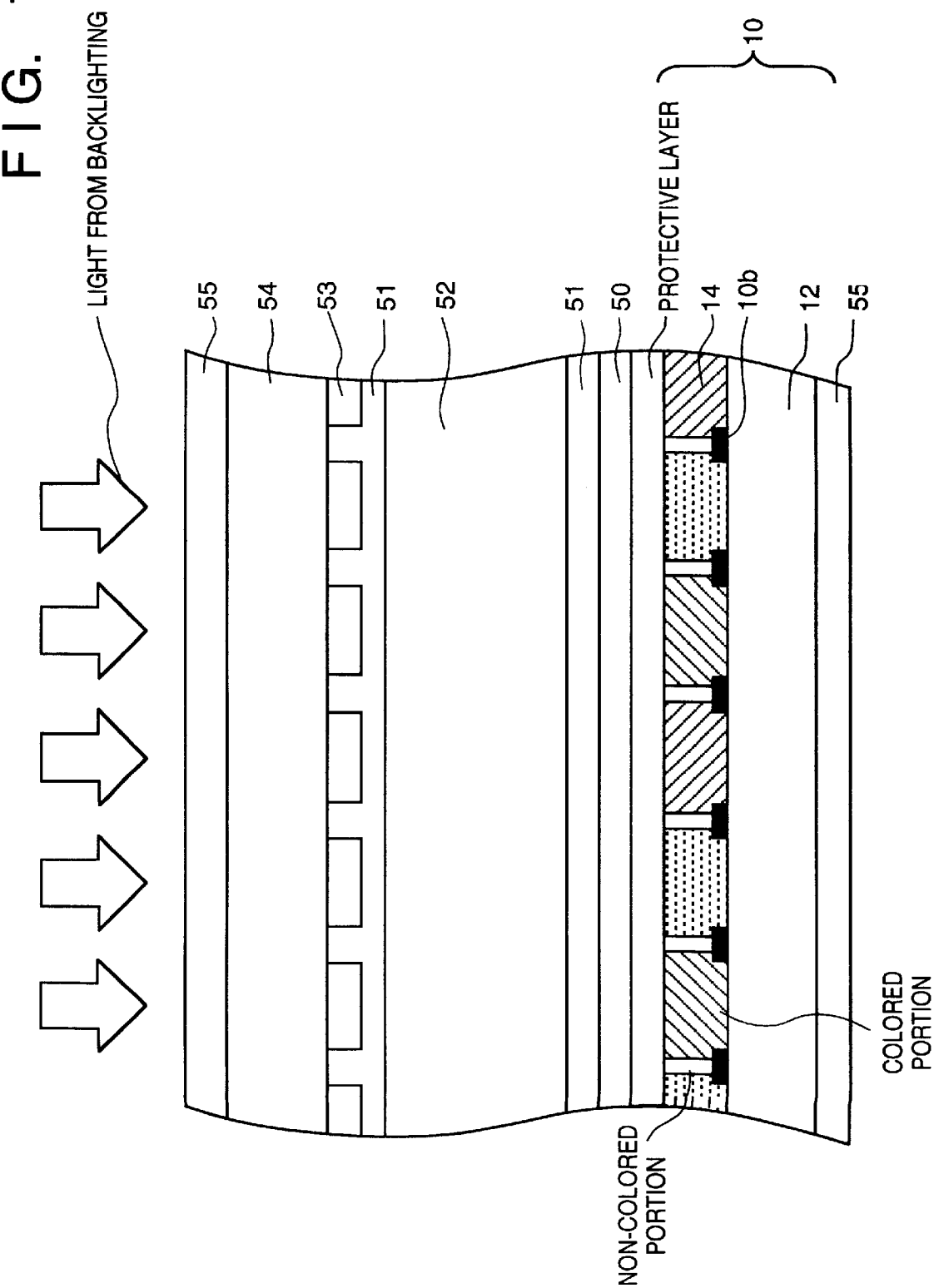
FIG. 10 is a side sectional view showing the structure of a color liquid crystal panel.
Figure 11:
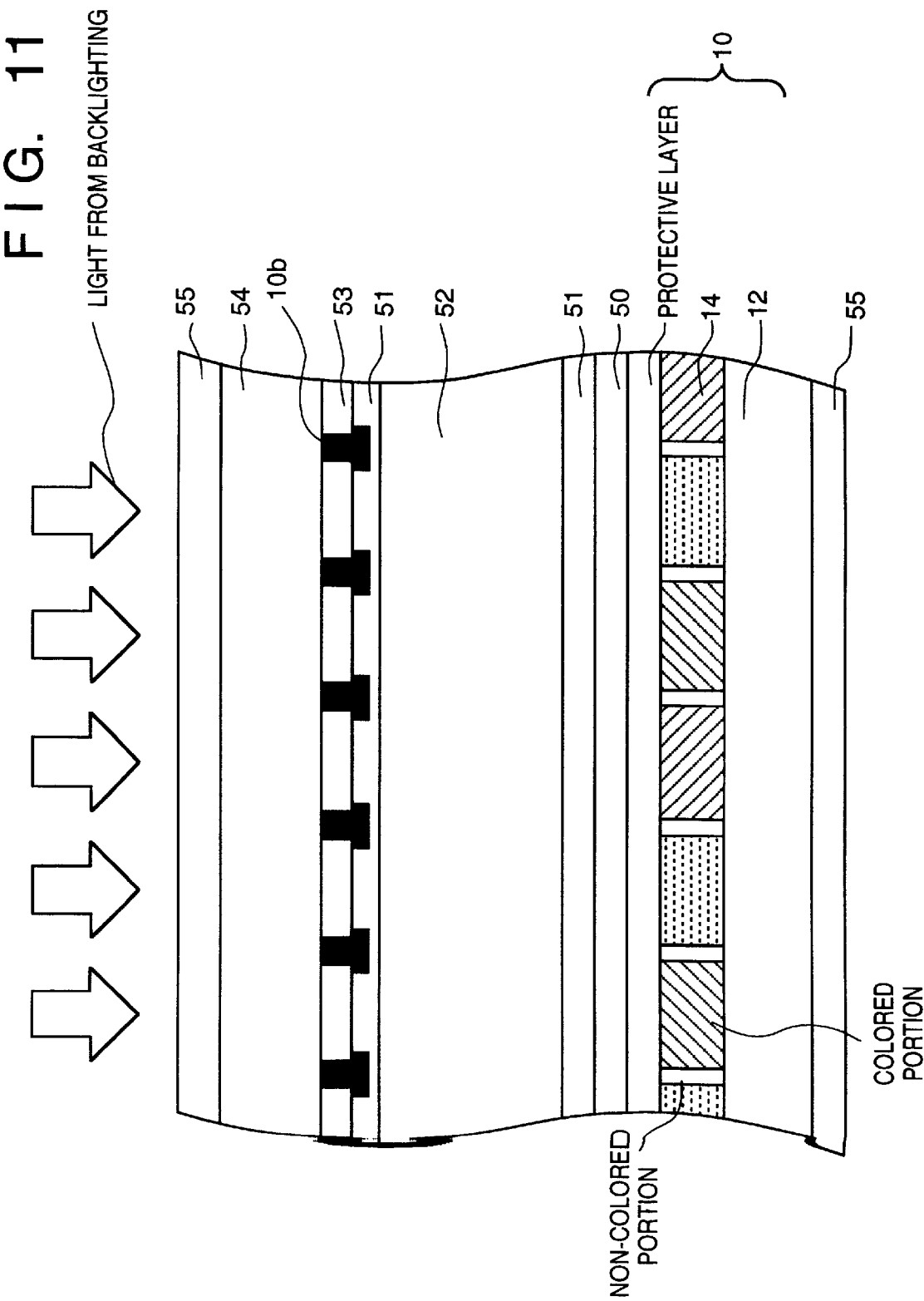
FIG. 11 is a side sectional view showing the structure of a color liquid crystal panel.

In general, a color liquid crystal panel is formed by joining the color filter substrate 12 to a counter substrate 54 and sealing a liquid crystal compound 52 therebetween. TFTs (Thin Film Transistors; not shown) and transparent pixel electrodes 53 are formed on the inner surface of one substrate 54 of the liquid crystal panel in a matrix form. The color filter 10 is placed on the inner surface of the other substrate 12 such that the R, G, and B coloring materials are positioned to oppose the pixel electrodes. A transparent counter electrode (common electrode) 50 is formed on the entire surface of the color filter 10. The light-shielding grating 10b is generally formed on the color filter substrate 12 side (see FIG. 10). However, in a BM (black matrix) on-array type liquid crystal panel, such a grating is formed on the TFT substrate side opposing the color filter substrate (see FIG. 11). Aligning films 51 are formed within the planes of the two substrates. By performing a rubbing process for the aligning films 51, the liquid crystal molecules can be aligned in a predetermined direction. Polarizing plates 55 are bonded to the outer surface of the respective glass substrates. The liquid crystal compound 52 is filled in the gap (about 2 to 5 $\mu$m) between these glass substrates. As a backlight, a combination of a fluorescent lamp (not shown) and a scattering plate (not shown) is generally used. A display operation is performed by causing the liquid crystal compound to serve as an optical shutter for changing the transmittance for light emitted from the backlight.

A case wherein the above liquid crystal panel is applied to an information processing apparatus will be described below with reference to FIGS. 12 to 14.

Figure 12:
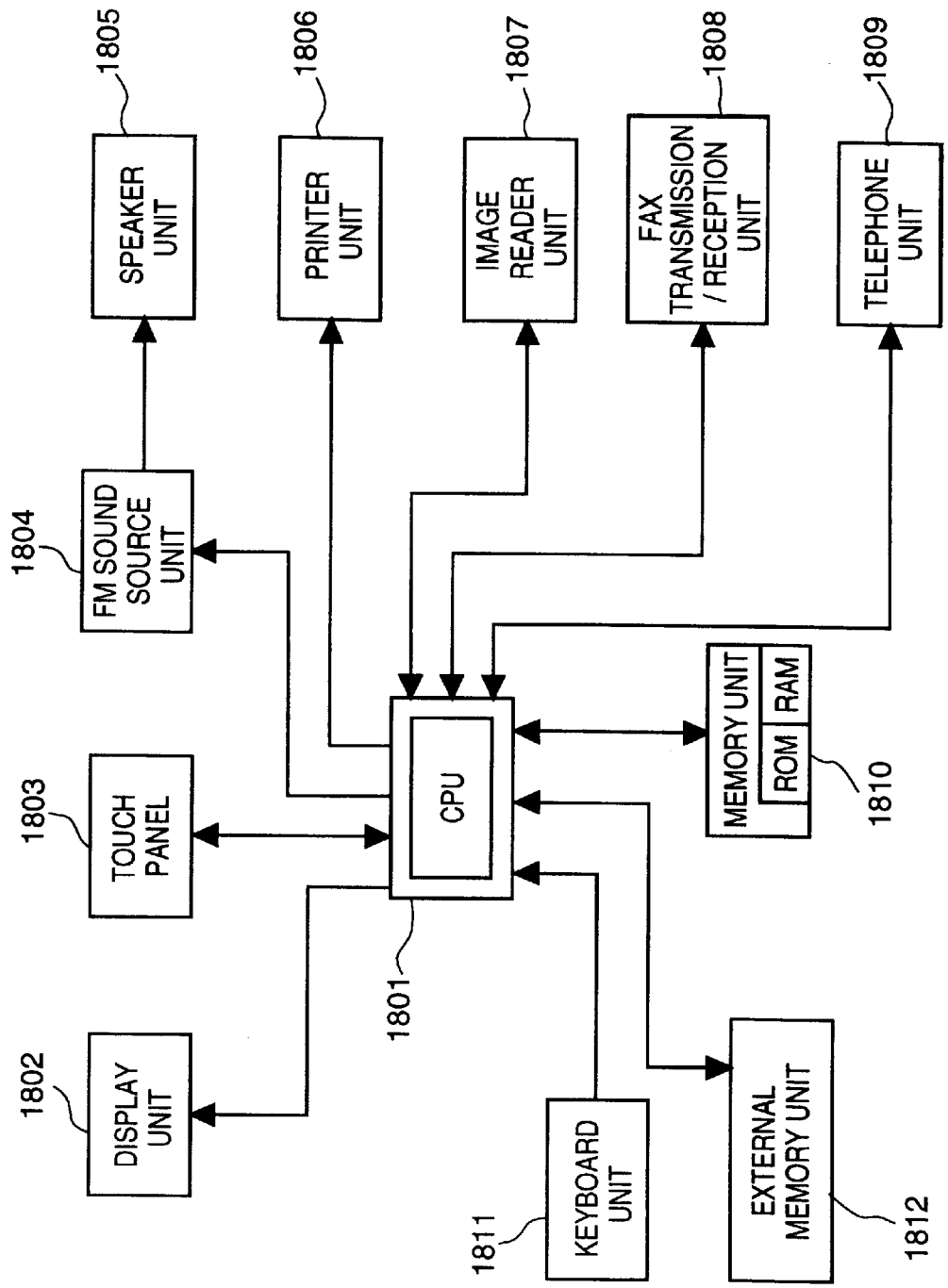
FIG. 12 is a block diagram showing an information processing apparatus using a liquid crystal panel.

FIG. 12 is a block diagram showing the schematic arrangement of an information processing apparatus serving as a wordprocessor, a personal computer, a facsimile apparatus, and a copying machine, to which the above liquid crystal panel is applied.

Referring to FIG. 12, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger of the user or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for the wordprocessor, the personal computer, the facsimile apparatus, and the copying machine.

Reference numeral 1807 denotes an image reader unit for photoelectrically reading original data. The image reader unit 1807 is arranged midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like as a memory medium. The external memory unit 1812 serves to store document information, music and speech information, application programs of the user, and the like.

Figure 13:
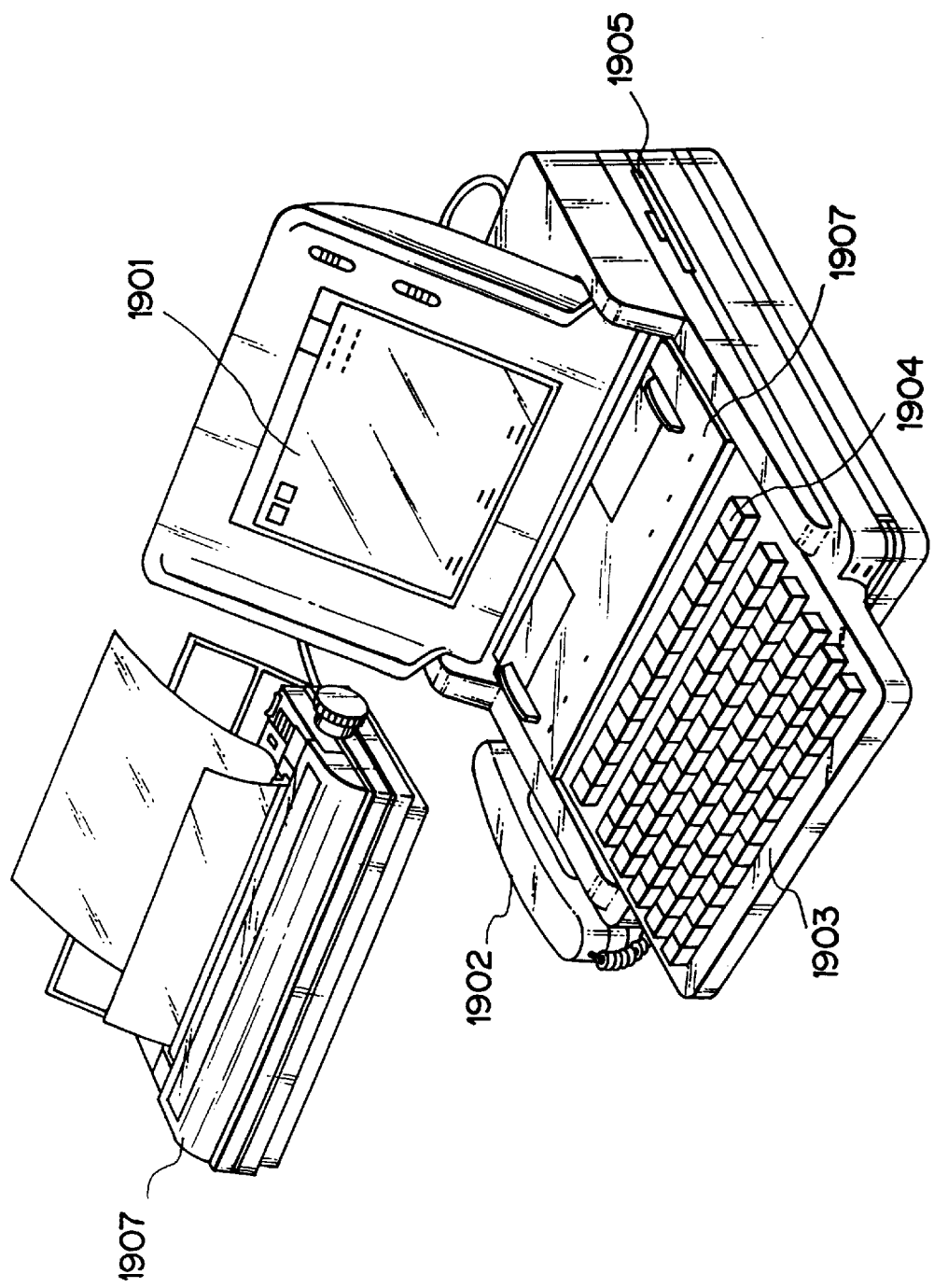
FIG. 13 is a perspective view showing an information processing apparatus using a liquid crystal panel.

FIG. 13 is a perspective view of the information processing apparatus in FIG. 12.

Referring to FIG. 13, reference numeral 1901 denotes a flat panel display using the above liquid crystal panel, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation, received data is printed out by an ink-jet printer 1907.

When the above information processing apparatus is to serve as a personal computer or a wordprocessor, various kinds of information input through the keyboard unit 1811 are processed by the control unit 1801 in accordance with a predetermined program, and the resultant information is output, as an image, to the printer unit 1806.

When the information processing apparatus is to serve as the receiver of the facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing apparatus is to serve as the copying machine, an original is read by the image reader unit 1807, and the read original data is output, as an image to be copied, to the printer unit 1806 via the control unit 1801. Note that when the information processing apparatus is to serve as the receiver of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 14:
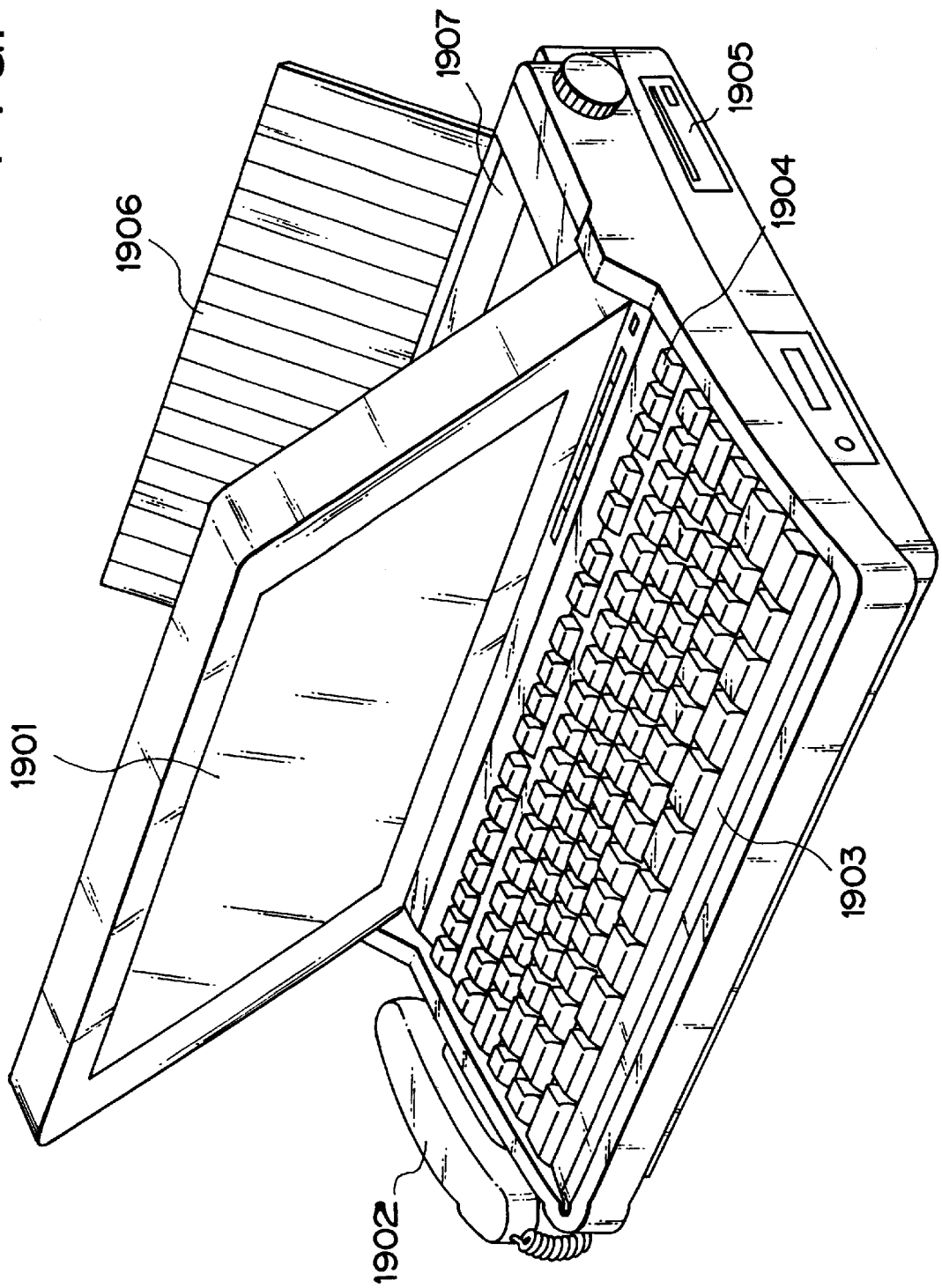
FIG. 14 is a perspective view showing an information processing apparatus using a liquid crystal panel.

Note that the above information processing apparatus may be designed as an integrated apparatus incorporating an ink-jet printer in the main body, as shown in FIG. 14. In this case, the portability of the apparatus can be improved. The same reference numerals in FIG. 14 denote parts having the same functions as those in FIG. 13.

Figure 3:
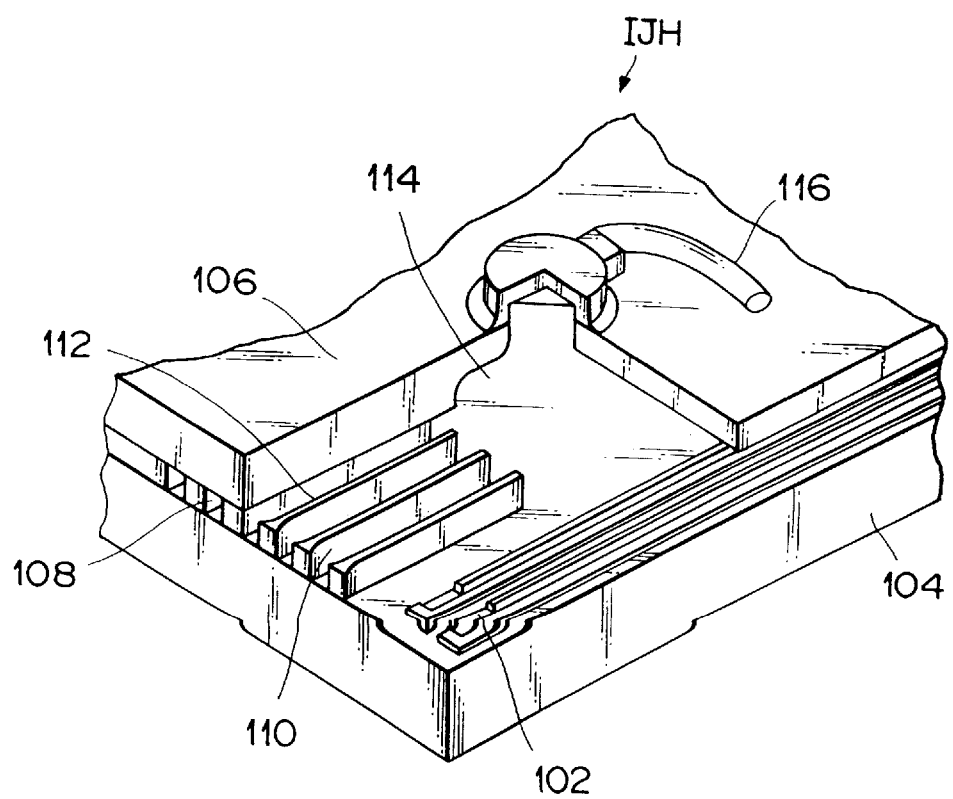
FIG. 3 is a view showing the structure of an ink-jet head IJH for spraying an ink on a layer to be colored.

FIG. 3 shows the structure of an ink-jet head IJH for spraying or ejecting ink on the layer 14 in the color filter as described above.

Referring to FIG. 3, the ink-jet head IJH mainly comprises a heater board 104 as a board on which a plurality of heaters 102 for heating an ink are formed, and a ceiling plate 106 mounted on the heater board 104. A plurality of discharging openings 108 are formed in the ceiling plate 106. Tunnel-like fluid passages 110 communicating with the discharging openings 108 are formed therebehind. The respective fluid passages 110 are isolated from the adjacent fluid passages via partition walls 112. The respective fluid passages 110 are commonly connected to one ink chamber 114 at the rear side of the fluid passages. An ink is supplied to the ink chamber 114 via an ink inlet 116. This ink is supplied from the ink chamber 114 to each fluid passage 110.

The heater board 104 and the ceiling plate 106 are positioned such that the position of each heater 102 coincides with that of a corresponding fluid passage 110, and are assembled into the state shown in FIG. 3. Although FIG. 3 shows only two heaters 102, the heater 102 is arranged in correspondence with each fluid passage 110. When a predetermined driving signal is supplied to the heater 102 in the assembled state shown in FIG. 3, an ink above the heater 102 is boiled to produce a bubble, and the ink is pushed and discharged from the discharging opening 108 upon volume expansion of the ink. Therefore, the size of a bubble can be adjusted by controlling a driving pulse applied to the heater 102, e.g., controlling the magnitude of power. That is, the volume of the ink discharged from each discharging opening can be arbitrarily controlled.

Figure 4:
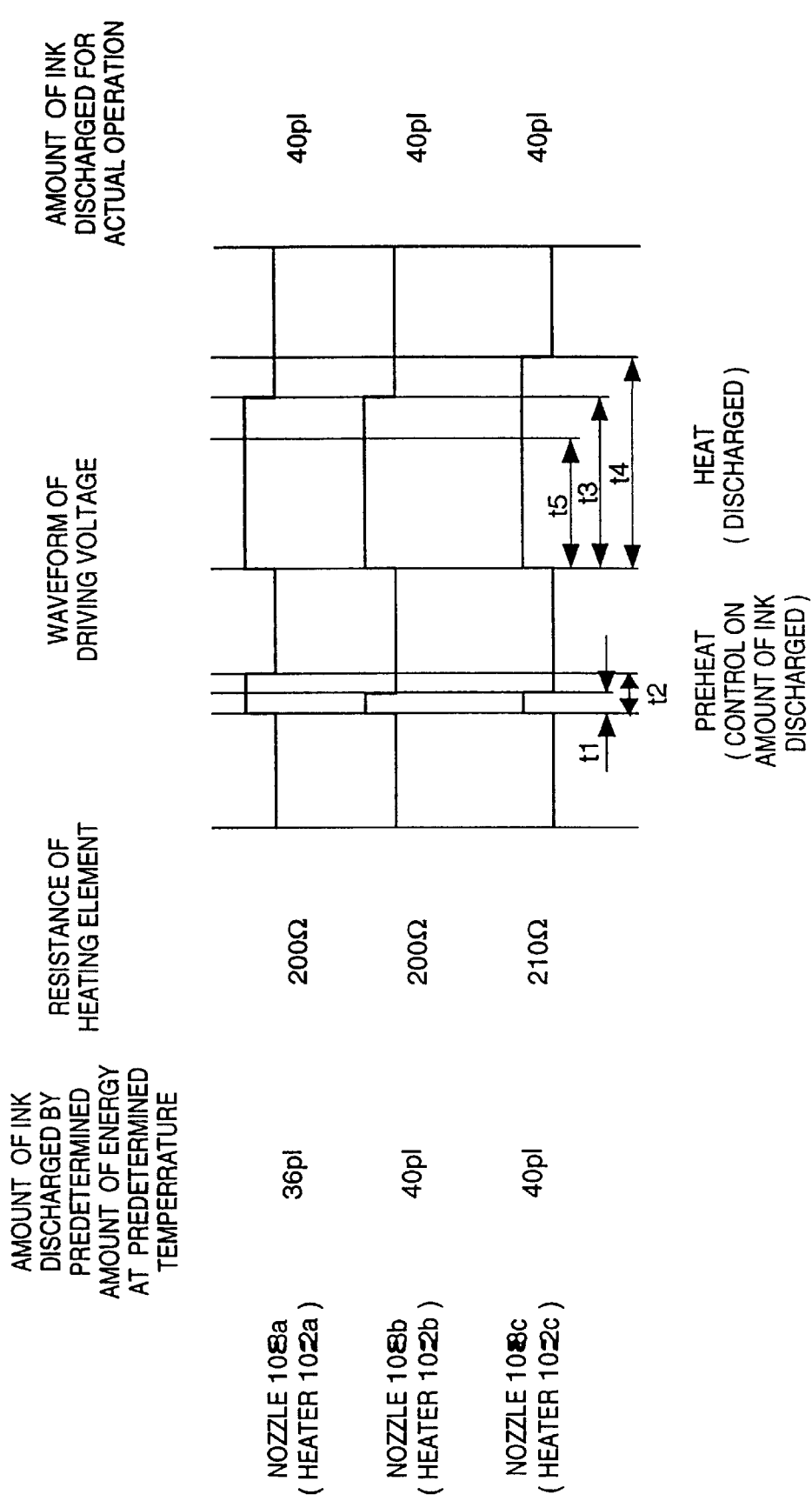
FIG. 4 is a timing chart for explaining a method of controlling the amount of ink discharged by changing power supplied to a heater.

FIG. 4 is a timing chart for explaining a method of controlling the amount of ink discharged by changing power supplied to each heater in this manner.

In this embodiment, two types of constant-voltage pulses are applied to each heater 102 to adjust the amount of ink discharged. The two pulses are a preheat pulse and a main heat pulse (to be simply referred to as a heat pulse hereinafter). The preheat pulse is a pulse for heating an ink to a predetermined temperature before the ink is actually discharged. The pulse width of this pulse is set to be smaller than a minimum pulse width t5 required to discharge the ink. Therefore, the ink is not discharged by this preheat pulse. The preheat pulse is applied to each heater 102 to increase the initial temperature of the ink to a predetermined temperature in advance so as to always make the amount of ink discharged constant when a constant heat pulse is applied to the heater 102 afterward. In contrast to this, the temperature of the ink may be adjusted in advance by adjusting the width of a preheat pulse. In this case, for the same heat pulse, the amount of ink discharged can be changed. In addition, by heating ink before application of a heat pulse, the start time required to discharge the ink upon application of the heat pulse can be shortened to improve the responsibility.

The heat pulse is a pulse for actually discharging the ink. The pulse width of the heat pulse is set to be larger than the minimum pulse width t5 required to discharge the ink. Energy generated by each heater 102 is proportional to the width (application time) of a heat pulse. Therefore, variations in the characteristics of the heaters 102 can be adjusted by adjusting the width of each heat pulse.

Note that the amount of ink discharged can also be adjusted by adjusting the interval between a preheat pulse and a heat pulse to control the dispersed state of heat upon application of the preheat pulse.

As is apparent from the above description, the amount of ink discharged can be controlled both by adjusting the application time of a preheat pulse and by adjusting the interval between application of a preheat pulse and that of a heat pulse. Therefore, by adjusting the application time of a preheat pulse or the interval between application of a preheat pulse and that of a heat pulse as needed, the amount of ink discharged or the responsibility of discharging of the ink with respect to an applied pulse can be arbitrarily adjusted.

Such adjustment of the amount of ink discharged will be described in detail next.

Assume that an ink is discharged in different amounts from discharging openings (nozzles) 108a, 108b, and 108c upon application of the same amount of energy, as shown in FIG. 4. More specifically, assume that when a predetermined amount of energy is applied at a predetermined temperature, the amount of ink discharged from the nozzle 108a is 36 pl (pico-liters); the amount of ink discharged from the nozzle 108b, 40 pl; and the amount of ink discharged from the nozzle 108c, 40 pl, and the resistance of heaters 102a and 102b corresponding to the nozzles 108a and 108b is 200Ω, and the resistance of a heater 102c corresponding to the nozzle 108c is 210Ω. Assume that the amounts of ink discharged from the nozzles 108a, 108b, and 108c are to be adjusted to 40 pl.

The widths of a preheat pulse and a heat pulse may be adjusted to adjust the amounts of ink discharged from the nozzles 108a, 108b, and 108c to the same amount. Various combinations of the widths of preheat pulses and heat pulses are conceivable. In this case, the amounts of energy generated by heat pulses are made equal for the three nozzles, and the amounts of ink discharged are adjusted by adjusting the widths of preheat pulses.

Since the heaters 102a and 102b for the nozzles 108a and 108b have the same resistance, i.e., 200Ω, the amounts of energy generated by heat pulses can be made equal by applying voltage pulses having the same width to the heaters 102a and 102b. In this case, the width of each voltage pulse is set to be t3 which is larger than the width t5. An ink is discharged in different amounts, i.e., 36 pl and 40 pl, from the nozzles 108a and 108b upon application of the same amount of energy. In order to increase the amount of ink discharged from the nozzle 108a, a preheat pulse having a width t2 larger than a width t1 of a preheat pulse applied to the heater 102b is applied to the heater 102a. With this operation, the amounts of ink discharged from the heaters 108a and 108b can be adjusted to 40 pl.

The heater 102c for the nozzle 108c has a resistance of 210Ω, which is higher than the resistance of the two remaining heaters 102a and 102b. For this reason, in order to cause the heater 102c to generate the same amount of energy as that generated by the two remaining heaters, the width of a heat pulse must be set to be larger than that of the above heat pulse. In this case, therefore, the width of the heat pulse is set to be t4 which is larger than the width t3. Since the amounts of ink discharged from the nozzles 108b and 108c upon application of a predetermined amount of energy are the same, the width of a preheat pulse required is equal to that of a preheat pulse applied to the heater 102b. That is, a preheat pulse having the width t1 is applied to the heater 102c.

In the above manner, the same amount of ink can be discharged from the nozzles 108a, 108b, and 108c which discharge an ink in different amounts upon application of a predetermined amount of energy. In addition, the amounts of ink discharged may be intentionally made to differ from each other.

Figure 5:
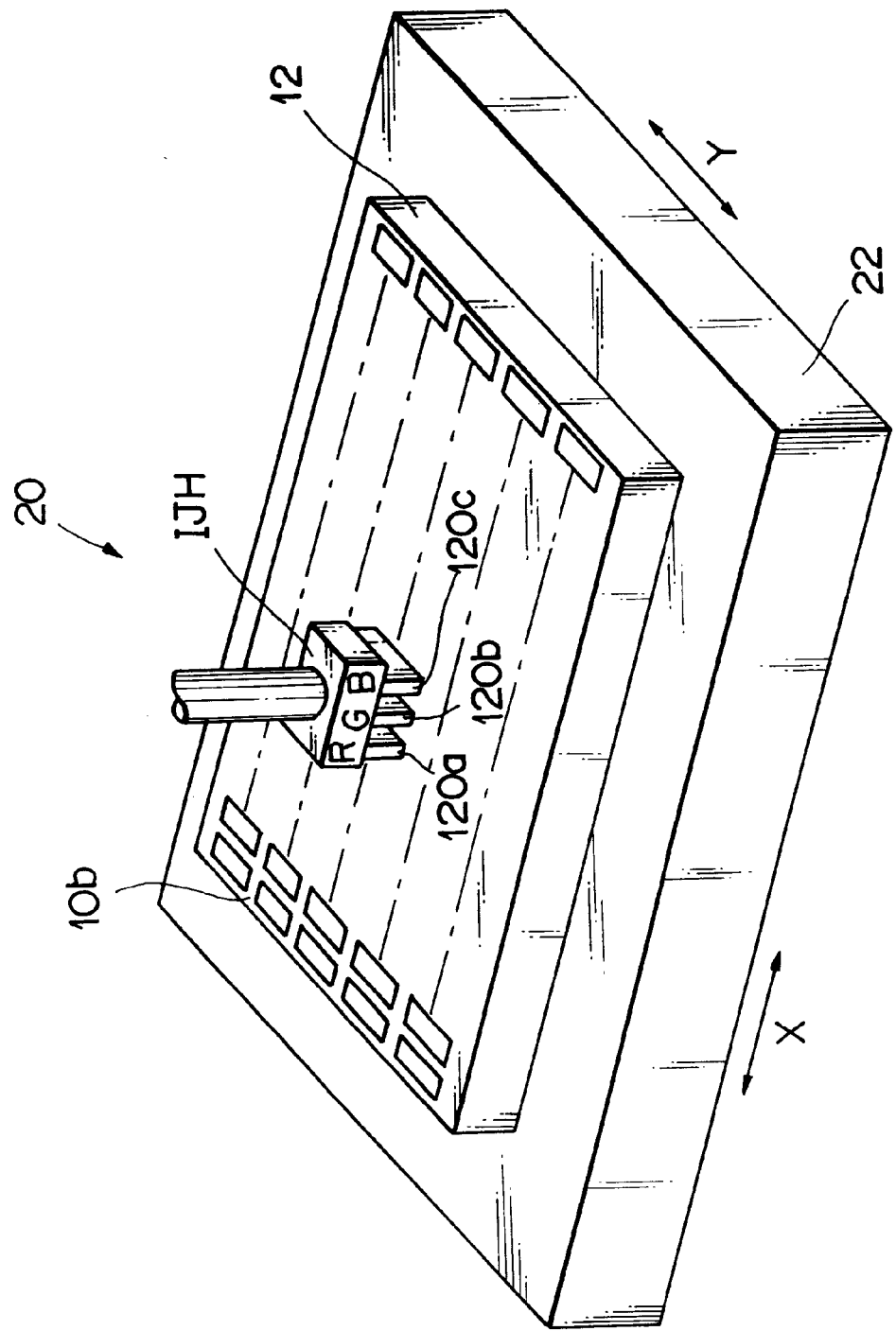
FIG. 5 is a perspective view showing the arrangement of an apparatus for manufacturing the color filter shown in FIGS. 1A or 1B and 2.

FIG. 5 shows the arrangement of an apparatus for manufacturing the color filter shown in FIGS. 1A or 1B and 2.

Referring to FIG. 5, a manufacturing apparatus 20 comprises an X-Y table 22 mounted on a base (not shown) and capable of moving in the X and Y directions in FIG. 5, and an ink-jet head IJH fixed on a base via a support member (not shown) above the X-Y table 22. A glass substrate 12 on which a light-shielding grating 10b and a layer 14 to be colored (see FIG. 2) are formed by the above method is placed on the X-Y table 22. The ink-jet head IJH includes a red head 120a for discharging a red ink, a green head 120b for discharging a green ink, and a blue head 120c for discharging a blue ink. These heads 120a, 120b, and 120c are designed to discharge inks independently.

In the manufacturing apparatus 20 having the above arrangement, an R (red), G (green), or B (blue) ink is discharged into a desired frame of the light-shielding grating 10b while the X-Y table 22 moves with respect to the ink-jet head IJH in the X and Y directions. In this manner, each frame of the light-shielding grating 10b is colored to complete a color filter.

Figure 6:
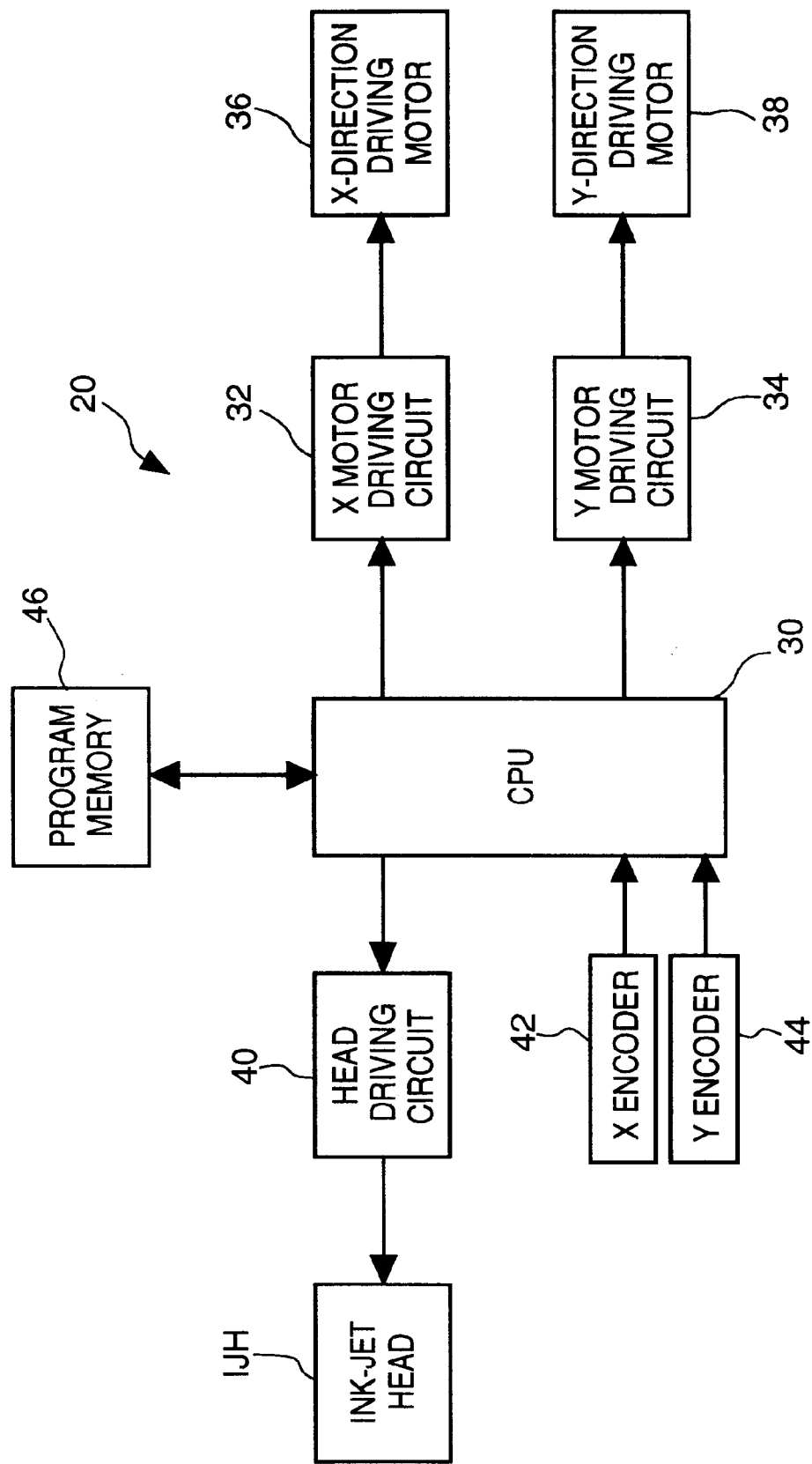
FIG. 6 is a block diagram showing the arrangement of the color filter manufacturing apparatus.

FIG. 6 is a block diagram showing the arrangement of the manufacturing apparatus 20.

Referring to FIG. 6, X- and Y-direction driving motors 36 and 38 for driving the X-Y table 22 in the x and Y directions are connected to a CPU 30 for controlling the overall operation of the manufacturing apparatus 20 via X and Y motor driving circuits 32 and 34. The ink-jet head IJH is also connected to the CPU 30 via a head driving circuit 40. Furthermore, X and Y encoders 42 and 44 for detecting the position of the X-Y table 22 are connected to the CPU 30. With this arrangement, position information on the X-Y table 22 is input to the CPU 30. In addition, a control program in a program memory 46 is input to the CPU 30. The CPU 30 moves the X-Y table 22 in accordance with this control program and position information from the X and Y encoders 42 and 44. With this operation, a desired grating frame on the glass substrate 12 is brought to a position below the ink-jet head IJH, and an ink having a desired color is discharged into the frame to color it. A color filter is manufactured by performing this operation for each frame of the light-shielding grating 10b.

Figure 7:
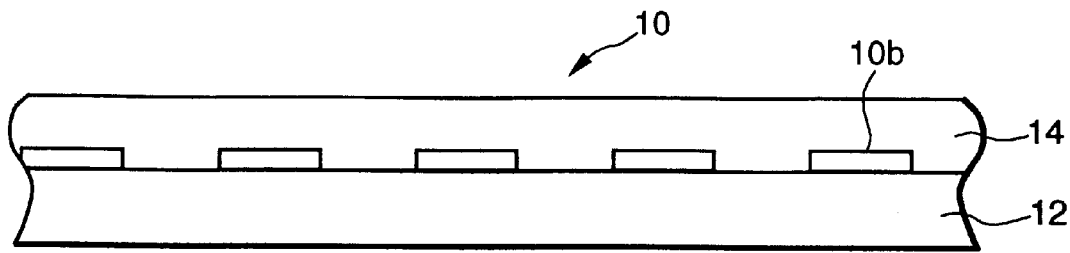
FIG. 7 is a sectional view showing a method of manufacturing a liquid crystal color filter.
Figure 8:
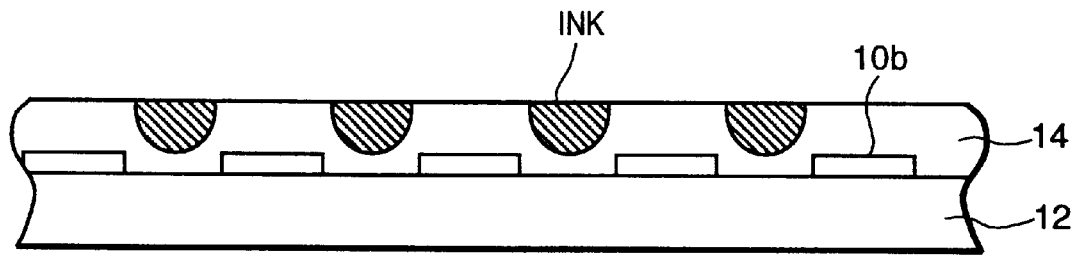
FIG. 8 is a sectional view showing the method of manufacturing the liquid crystal color filter.
Figure 9:
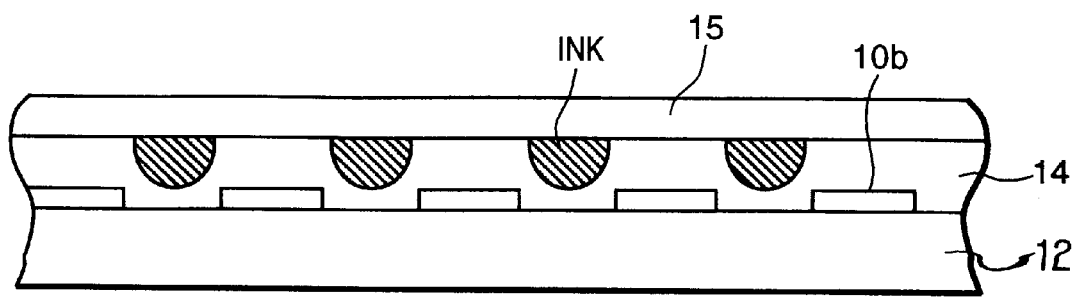
FIG. 9 is a sectional view showing the method of manufacturing the liquid crystal color filter.

FIGS. 7 to 9 are sectional views showing the concept of a color filter manufacturing method of this embodiment.

By the above method, the light-shielding grating 10b is formed on the glass substrate 12 cleaned by a normal method, as shown in FIG. 7. The layer 14 to be colored is formed thereon. As a method of forming the layer 14 to be colored, a material is dissolved or dispersed in a proper solvent to obtain a coating solution. The coating solution prepared in this manner is coated by a roller coater method, a blade coater method, an air-knife coater method, a rod bar coater method, a spin coater method, and the like. The resultant structure is baked by an oven, a hotplate, or the like to evaporate the solvent, thereby forming a film. At this time, a numerical value d of a thickness in $\mu$m of the dry film must satisfy a relation d>Vo/500 with respect to a numerical value of an amount Vo in pl (pico-liters) of ink discharged at one discharge (one droplet) from an ink-jet head to be used.

The light-shielding grating 10b need not be performed on the glass substrate 12. As is well known, the layer 14 to be colored may be formed on the glass substrate 12, and then the light-shielding grating 10b may be formed thereon by photolithography or an ink-jet method.

The material of the layer 14 to be colored must have ink reception ability, a high dot resolution, and excellent transparency. In addition, when a transparent substrate or a protective film is to be used, the material of the layer 14 to be colored must have good adhesion properties with the protective film and a process resistance such as heat resistance.

A preferable example of the material of the layer 14 to be colored is an ink reception layer (layer to be colored) material used for a well-known ink-jet OHP film, but other examples are polyvinyl alcohol, polyvinyl pyrrolidone, a starch, casein, albumin, sodium alginate, gelatin, polyacrylamide, carboxymethyl cellulose, methyl cellulose, hydroxyethyl cellulose, hydroxypropyl cellulose, polyvinyl acetate, polyacrylic acid, and derivatives of these examples. The material of the layer 14 to be colored is not limited to them, as a matter of course. Of these examples, hydroxypropyl cellulose and a derivative thereof are preferably used from the viewpoint of the process resistance such as heat resistance. These examples are excellent in adhesion properties and heat resistance, and can be easily used in a manufacturing process. From the viewpoint of the transparency and the ink reception ability, these examples are preferably used as the layer to be colored of a color filter. In addition, these examples have a high dot resolution. For this reason, if the conditions of the present invention are satisfied, i.e., the numerical value of the thickness (d $\mu$m) of a dry film satisfies the relation d>Vo/500 with respect to the numerical value of the amount Vo (pl: pico-liter) of ink discharged at one discharge (one droplet) from the ink-jet head to be used, inks of three different colors (red, green, and blue) will not mix with each other in the layer 14 to be colored.

In order to improve the process resistance, a crosslinking agent such as methylol melamine, methylol hydroxypropylene urea, dimethylol urea, and isocyanate, which is not limited to them, may be mixed in the material of a layer to be colored. Upon printing by an ink-jet system, the resultant structure may be heated or set by light irradiation.

Preferable examples of the material of the layer 14 to be colored are acrylic-based polymers containing a crosslinkable monomer unit, such as N-methylolacrylamide, which can improve the process resistance. When each of these examples is used for a layer to be colored, the layer to be colored which is colored by the ink-jet system is heated or set by light irradiation.

A suitable color filter can be formed if the above relation d>Vo/500 is established when the numerical value of the thickness of the material of the layer 14 to be colored is d ($\mu$m) and the numerical value of the amount of ink discharged is Vo (pl: pico-liter).

As for the ink permeability of the layer 14 to be colored, its penetration degree and speed are not particularly limited as long as the layer 14 to be colored can absorb an ink to be used. It is enough for the layer 14 to be colored to have almost the same penetration degree and speed as those of a general material to be recorded for an ink-jet printer. More specifically, when a 50-pl ink is discharged to a layer to be colored having a thickness of 1 $\mu$m, a time required for the ink to penetrate the layer to be colored is preferably about 5 minutes to 1 hour at most. According to the embodiment, the layer 14 to be colored has an absorbency of which an ink no longer exists as fluid on the surface of the layer one hour after the ink is discharged. As a means of determining, it is suggested to view the surface of the layer 14 to be colored with a microscope. By viewing the surface of the layer with a microscope, it can be determined whether or not the ink still exists as fluid on the surface of the layer, for instance, whether the ink flows out of the substrate when the glass substrate 12 is tilted.

The number of ink droplets discharged to one film element is preferably 1 to 7 when the volume of one droplet is assumed to be 40 pl. In particular, when one filter element is colored by a plurality of ink droplets, there is a time difference between a discharging operation of one ink droplet to a layer to be colored and that of the next ink droplet. Therefore, the next ink droplet is discharged after the first ink droplet is absorbed in the layer to be colored to a certain degree, realizing high-quality coloring free from color non-uniformity. When one filter element is to be colored by a plurality of ink droplets, the droplets can be discharged and overlaid on a same spot or can be discharged on a different spot by shifting the spot little by little.

As shown in FIG. 8, R (red), G (green), and B (blue) inks are discharged to the layer 14 to be colored which is formed in the above manner in accordance with the pattern of the light-shielding grating 10b by the ink-jet method. Alternatively, as described above, both the pattern of the light-shielding grating 10b and the pattern of R, G, and B may be formed by discharging the inks by the ink-jet system. The numerical value of the volume of each ink dot at this time is Vo (pl: pico-liter), as described above. The ink-jet system comprises a system using heat energy and a system using mechanical energy, either of which can be suitably used.

An ink is not particularly limited as long as it can be used for the ink-jet system. The dyes or pigments of R, G, and B may be selected in accordance with application purposes. Any solvent composition can be used as long as it can be used for the ink-jet system, and a composition is not particularly limited.

A dye and a pigment can be suitably used as coloring materials. The above relation is hardly affected by the kind of coloring material, but depends on an ink solvent.

Preferable examples of an ink solvent to be used are water generally used as an ink-jet ink, and a water-soluble organic solvent used by being mixed with water. Examples of the water-soluble organic solvent are alkyl alcohols having 1 to 4 carbon atoms (e.g., methyl alcohol, ethyl alcohol, n-propyl alcohol, isopropyl alcohol, n-butyl alcohol, sec-butyl alcohol, and tert-butyl alcohol), amides (e.g., dimethylformamide and dimethylacetamide), ketones or ketoalcohols (e.g., acetone and diacetone alcohol), ethers (e.g., tetrahydrofuran and dioxane), polyalkylene glycols (e.g., polyethylene glycol and polypropylene glycol), alkylene glycols containing an alkylene group having 2 to 6 carbon atoms (e.g., ethylene glycol, propylene glycol, butylene glycol, triethylene glycol, 1,2,6-hexanetriol, thiodiglycol, hexylene glycol, and diethylene glycol), lower alkyl ethers of a polyhydric alcohol (e.g., glycerine, ethylene glycol monomethyl (or monoethyl) ether, diethylene glycol methyl (or ethyl) ether, and triethylene glycol monomethyl (or monoethyl) ether), N-methyl-2-pyrrolidone, 2-pyrrolidone, and 1.3-dimethyl-2-imidazolidinon. The ink solvent is not particularly limited as long as it does not cause any problem in ink discharging performance of the ink-jet head.

Of these examples, more preferable examples are alkyl alcohols containing an alkylene group having 2 to 6 carbon atoms (e.g., ethylene glycol, propylene glycol, butylene glycol, triethylene glycol, 1,2,6-hexanetriol, thiodiglycol, hexylene glycol, and diethylene glycol), and N-methyl-2-pyrrolidone. By using one or a plurality of these solvents, the effect of the present invention can be achieved sufficiently. In addition, an additive such as a surfactant may be added to the ink.

As shown in FIG. 9, a protective film 15 is coated on the layer 14 to be colored to which the ink is discharged by the ink-jet system. This arrangement can greatly improve the process resistance, and particularly resistance to solvents. If the layer 14 to be colored itself has a sufficient process resistance, the protective film 15 can be eliminated, but generally formed.

A coating method may be the same as that of coating the layer to be colored. The material of the protective film 15 is not particularly limited as long as it is a protective film material used for a general color filter. An acrylic or epoxy thermosetting/photosetting material can be suitably used.

Further, the coated substrate is baked by an oven, a hotplate, or the like to form a film. The thickness of this protective film, which is determined by required properties and the like, is about 0.1 to 10 $\mu$m.

According to the color filter formed by the above ink-jet method, the number of steps is greatly decreased. The color filter can be manufactured at a reduced material cost. It has satisfactory process resistances such as heat resistance and resistance to solvents, and also satisfactory ink reception ability and dot resolution. Therefore, the color filter performance is very high as a color liquid crystal display free from ink blurring, color mixing, and white omissions.

Examples in which color filters are manufactured by the manufacturing method of this embodiment will be described next.

(EXAMPLE 1)

A thermosetting resin composition consisting of a mixture of hydroxypropyl cellulose (HPC-H available from Nihon Soda) and dimethylol hydroxyethylene urea (Sumitex resin NS-11 available from Sumitomo Kasei) was spin-coated on a glass substrate on which a light-shielding grating was formed so as to have a dry film thickness of 0.6 $\mu$m. The resultant structure was pre-baked at 110° C. for 10 minutes. This structure served as a layer to be colored. By the above-mentioned manufacturing apparatus, the layer to be colored was colored in the matrix pattern of R, G, and B with pigment inks. The amount of ink discharged of each color was 40 pl at that time. The resultant structure was baked at 230° C. for 1 hour to advance a crosslinking reaction, setting the layer to be colored. Subsequently, the resultant structure was washed to remove dust. Upon drying, a two-pack thermosetting resin material was spin-coated thereon to have a film thickness of 1 $\mu$m. The resultant structure was heat-treated at 250° C. for 30 minutes to set the coated material. As a result, a liquid crystal color filter was formed. A relation between the numerical value of the thickness of the layer to be colored and the volume of a droplet was 0.6=40/66.7>40/500=0.08.

(EXAMPLE 2)

A liquid crystal color filter was formed in the same manner as in Example 1 except for a thermosetting resin composition consisting of a mixture of hydroxyethyl cellulose (AH-15 available from Fuji Chemical) and methylated methylolmelamine (M-6 available from Sumitomo Kasei).

(EXAMPLE 3)

A liquid crystal color filter was formed in the same manner as in Example 1 except that an ink was a dye ink.

(EXAMPLE 4)

A resin composition consisting of a mixture of hydroxypropyl cellulose (HPC-H available from Nihon Sotatsu) and dimethylol hydroxyethylene (Sumitex resin NS-3spe available from Sumitomo Kasei) was spin-coated on a glass substrate on which a light-shielding grating was formed so as to have a dry film thickness of 0.5 $\mu$m. The resultant structure was pre-baked at 120° C. for 10 minutes. This structure served as a layer to be colored. By the above-mentioned manufacturing apparatus, the layer to be colored was colored in the matrix pattern of R, G, and B with pigment inks. The amount of ink discharged of each color was 50 pl at that time. The resultant structure was heated at 220° C. for 50 minutes to advance a crosslinking reaction, setting the layer to be colored. Subsequently, the resultant structure was washed to remove dust. Upon drying, a two-pack thermosetting resin material was spin-coated thereon to have a film thickness of 1 $\mu$m. The resultant structure was heat-treated at 250° C. for 30 minutes to set the coated material. As a result, a liquid crystal color filter was formed. A relation between the numerical value of the thickness of the layer to be colored and the volume of a droplet was 0.5=50/100>50/500=0.1.

(EXAMPLE 5)

A liquid crystal color filter was formed in the same manner as in Example 4 except that an ink was a dye ink.

The liquid crystal color filters formed in Examples 1 to 5 were observed with an optical microscope. Any faults such as discoloration, mixing of R, G, and B colors, color nonuniformity, ink blurring, and white omissions were not observed.

A series of operations, e.g., formation of ITO and aligning films and sealing of a liquid crystal material, were performed by using the obtained color filter, thereby forming a color liquid crystal driving apparatus. When the manufactured color liquid crystal driving apparatus was driven within a temperature range of 0° C. to 40° C. continuously for 1,000 hours, no failure occurred. Further, when this color liquid crystal driving apparatus was set on an OHP and driven to perform a reflection operation continuously for 1,000 hours, no change in transmittance and color tone was confirmed.

(Comparative Example 1)

A liquid crystal color filter was formed in the same manner as in Example 1 except that a resin composition for a layer to be colored was coated to have a dry film thickness of 0.05 μm. A relation between the numerical value of the thickness of the layer to be colored and the volume of a droplet was 0.05=40/800<40/500=0.08.

(Comparative Example 2)

A liquid crystal color filter was formed in the same manner as in Example 4 except that a resin composition for a layer to be colored was coated to have a dry film thickness of 0.08 μm. A relation between the numerical value of the thickness of the layer to be colored and the volume of a droplet was 0.08=50/625<50/500=0.1.

The liquid crystal color filters formed in Comparative Examples 1 and 2 were observed with an optical microscope. No discoloration occurred but faults of color nonuniformity and color mixing were observed.

As has been described above, according to this embodiment, assume that the numerical value of the thickness of the layer to be colored is to be d (μm), and that the numerical value of the volume of a droplet is to be Vo pl (pico-liters). If d>Vo/500, preferably d>Vo/200, and more preferably d>Vo/100 are established, ink blurring which may occur in a very thin layer to be colored is prevented to prevent color mixing between adjacent filter elements, and the like. Therefore, a color filter can be manufactured without causing any ink blurring and any color mixing. Various changes and modifications of the above embodiment can be made without departing the scope and spirit of the invention.

For example, in the above embodiments, the ink-jet head is fixed, and the X-Y stage is moved. However, the ink-jet head may be moved while the stage is fixed. As the ink-jet head, a so-called piezoelectric type head using mechanical energy converters such as piezoelectric elements may be used. In this case, the volume of the ink discharged can be easily adjusted by adjusting the applied voltage of a driving pulse. When a bipolar driving operation is to be performed, the ink volume can be adjusted by adjusting both or either of bipolar driving pulses.

The present invention can be applied to a single-color filter and a filter of a type having a plurality of single-color filters of different colors stacked on each other.

According to the above description, the present invention is applied to the print apparatus of the system, among various ink-jet recording systems, which has a means (e.g., an electricity-to-heat converter or laser light) for generating heat energy as energy used to discharge an ink, and changes the state of an ink by using the heat energy. According to this system, a high-density, high-definition recording operation can be realized.

As for the typical structure and principle, it is preferable that the basic structure disclosed in, for example, U.S. Pat. Nos. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electricity-to-heat converter disposed to face a sheet or a fluid passage which holds the fluid (ink) to a level higher than levels at which film boiling takes place are applied to the electricity-to-heat converter in accordance with recording information so as to generate heat energy in the electricity-to-heat converter and to cause the heat effecting surface of the recording head to take place film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. No. 4,463,359 or 4,345,262 is employed. If conditions disclosed in U.S. Pat. No. 4,313,124 which is an invention relating to the temperature rising ratio at the heat effecting surface are employed, a satisfactory recording result can be obtained.

As an alternative to the structure (linear fluid passage or perpendicular fluid passage) of the recording head disclosed in each of the aforesaid inventions and having an arrangement that discharge ports, fluid passages and electricity-to-heat converters are combined, a structure having an arrangement that the heat effecting surface is disposed in a bent region and disclosed in U.S. Pat. No. 4,558,333 or 4,459,600 may be employed. In addition, the following structures may be employed: a structure having an arrangement that a common slit is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a recording head of the full line type having a length corresponding to the maximum width of a recording medium which can be recorded by the recording apparatus, either the construction which satisfies its length by a combination of a plurality of recording heads as disclosed in the above specifications or the construction as a single full line type recording head which has integrally been formed can be used.

In addition, the invention is effective for a recording head of the freely exchangeable chip type which enables electrical connection to the recording apparatus main body or supply of ink from the main device by being mounted onto the apparatus main body, or for the case by use of a recording head of the cartridge type provided integrally on the recording head itself.

It is preferred to additionally employ the recording head restoring means and the auxiliary means provided as the component of the present invention because the effect of the present invention can be further stabled. Specifically, it is preferable to employ a recording head capping means, a cleaning means, a pressurizing or suction means, an electricity-to-heat converter, another heating element or a sub-heating means constituted by combining them and a sub-emitting mode in which an emitting is performed independently from the recording emitting in order to stably perform the recording operation.

Although a fluid ink is employed in the aforesaid embodiment of the present invention, an ink which is solidified at the room temperature or lower and softened at the room temperature, an ink in the form of a fluid at the room temperature, or an ink which is formed into a fluid when the recording signal is supplied may be employed because the aforesaid ink-jet method is ordinarily arranged in such a manner that the temperature of ink is controlled in a range from 30° C. or higher to 70° C. or lower so as to make the viscosity of the ink to be included in a stable discharge range.

Furthermore, an ink which is solidified when it is caused to stand, and liquified when heat energy is supplied in accordance with a recording signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a recording signal so as to be discharged in the form of fluid ink, or an ink which is liquified only after heat energy is supplied, e.g., an ink which starts to solidify when it reaches a recording medium, can be adapted to the present invention. In the aforesaid case, the ink may be of a type which is held as fluid or solid material in a recess of a porous sheet or a through hole at a position to face the electricity-to-heat converter as disclosed in Japanese Patent Laid-Open No. 54-56847 or Japanese Patent Laid-Open No. 60-71260. It is the most preferred way for the ink to be adapted to the aforesaid film boiling method.

As has been described above, according to this embodiment, assume that the numerical value of the thickness of the layer to be colored is to be $d(\mu m)$, and that the numerical value of the volume of a droplet is to be Vo (pl: pico-liters). If $d>Vo/500$ is established, ink blurring which occurs in a very thin layer to be colored is prevented to prevent color mixing between adjacent filter elements, and the like. Therefore, a color filter can be manufactured without causing any ink blurring and any color mixing.

In addition, droplets are discharged by using the ink-jet head. With this arrangement, a color filter having filter elements in a plurality of colors can be manufactured by one step, achieving a reduction in cost of the color filter.

The present invention is not limited to the above embodiments and various changes and modifications can be made within the spirit and scope of the present invention. Therefore, to apprise the public of the scope of the present invention the following claims are made.

What is claimed is:

1. A manufacturing method of manufacturing a color filter using an ink-jet head, said method comprising the steps of:

providing a transparent substrate having a layer to be colored thereon, the surface of said layer being substantially flat; and discharging an ink of a predetermined color to said layer for coloring said layer, wherein a numerical value d of a thickness in $\mu m$ of said layer to be colored and a numerical value Vo of a volume in pl (pico-liter) of said ink to be discharged at one discharge are adjusted to establish $d>Vo/500$.

2. The method according to claim 1, wherein the numerical value of the thickness of said layer to be colored and the numerical value of the volume of said ink are further adjusted to establish $d>Vo/200$.

3. A method according to claim 2, wherein ink is discharged on different spots on said layer by incremental shifting.

4. A method according to claim 2, wherein said layer to be colored is divided into a plurality of filter elements, and color mixing is not caused between adjacent filter elements after discharging ink from the ink jet head.

5. The method according to claim 2, wherein the numerical value of the thickness of said layer to be colored and the numerical value of the volume of said ink are further adjusted to establish $d>Vo/100$.

6. A method according to claim 5, wherein ink is discharged on different spots on said layer by incremental shifting.

7. A method according to claim 5, wherein said layer to be colored is divided into a plurality of filter elements, and color mixing is not caused between adjacent filter elements after discharging ink from the ink jet head.

8. The method according to claim 1, wherein the predetermined color comprises three colors of red, green, and blue, or four colors of red, green, blue, and black.

9. A method according to claim 8, wherein ink is discharged on different spots on said layer by incremental shifting.

10. A method according to claim 8, wherein said layer to be colored is divided into a plurality of filter elements, and color mixing is not caused between adjacent filter elements after discharging ink from the ink jet head.

11. The method according to claim 1, wherein said step of discharging said ink to said layer to be colored is performed using said ink-jet head for discharging said ink to perform coloring.

12. A method according to claim 11, wherein ink is discharged on different spots on said layer by incremental shifting.

13. A method according to claim 11, wherein said layer to be colored is divided into a plurality of filter elements, and color mixing is not caused between adjacent filter elements after discharging ink from the ink jet head.

14. The method according to claim 11, wherein said ink-jet head comprises a head for discharging said ink by using heat energy, said ink-jet head having a heat energy generator for generating heat energy applied to said ink.

15. A method according to claim 14, wherein ink is discharged on different spots on said layer by incremental shifting.

16. A method according to claimed 14, wherein said layer to be colored is divided into a plurality of filter elements, and color mixing is not caused between adjacent filter elements after discharging ink from the ink jet head.

17. The method according to claim 14, wherein the volume of said ink to be discharged is controlled by changing a driving pulse applied to said heat energy generator.

18. A method according to claim 14, wherein ink is discharged on different spots on said layer by incremental shifting.

19. A method according to claim 17, wherein said layer to be colored is divided into a plurality of filter elements, and color mixing is not caused between adjacent filter elements after discharging ink from the ink jet head.

20. The method according to claim 1, wherein said layer to be colored is divided into a plurality of rectangular filter elements, and each filter element is formed in a rectangular shape having shorter sides of 50 to 100 $\mu m$ and longer sides of 150 to 450 $\mu m$.

21. A method according to claim 20, wherein ink is discharged on different spots on said layer by incremental shifting.

22. A method according to claim 20, wherein color mixing is not caused between adjacent filter elements after discharging ink from the ink jet head.

23. A method according to claim 1, wherein ink is discharged on different spots on said layer by incremental shifting.

24. A method according to claim 1, wherein said layer to be colored is divided into a plurality of filter elements, and color mixing is not caused between adjacent filter elements after discharging ink from the ink jet head.

25. A color filter formed by a method using an ink-jet head, said method comprising the steps of:
   providing a transparent substrate having a layer to be colored thereon, the surface of said layer being substantially flat; and
   discharging an ink of a predetermined color to said layer for coloring said layer, wherein a numerical value d of a thickness in $\mu$m of said layer to be colored and a numerical value Vo of a volume in pl (pico-liter) of said ink to be discharged at one discharge are adjusted to establish d>Vo/500.

26. A color filter according to claim 25, wherein ink is discharged on different spots on said layer by incremental shifting.

27. A color filter according to claim 25, wherein said layer to be colored is divided into a plurality of filter elements, and color mixing is not caused between adjacent filter elements after discharging ink from the ink jet head.

28. The color filter according to claim 25, wherein said layer to be colored is divided into a plurality of rectangular filter elements, and each filter element is formed in a rectangular shape having shorter sides of 50 to 100 $\mu$m and longer sides of 150 to 450 $\mu$m.

29. A color filter according to claim 28, wherein ink is discharged on different spots on said layer by incremental shifting.

30. A color filter according to claim 28, wherein color mixing is not caused between adjacent filter elements after discharging ink from the ink jet head.

31. A liquid crystal display apparatus comprising:
   a color filter formed by a method using an ink-jet head, the method comprising the steps of providing a transparent substrate having a layer to be colored thereon, the surface of said layer being substantially flat, and discharging an ink of a predetermined color to said layer for coloring said layer, wherein a numerical value d of a thickness in $\mu$m of said layer to be colored and a numerical value Vo of a volume in pl (pico-liter) of said ink to be discharged at one discharge are adjusted to establish d>Vo/500; and
   a second substrate opposing said color filter, wherein a liquid crystal compound is sealed between said transparent substrate and said second substrate.

32. An apparatus according to claim 31, wherein ink is discharged on different spots on said layer by incremental shifting.

33. An apparatus according to claim 31, wherein said layer to be colored is divided into a plurality of filter elements, and color mixing is not caused between adjacent filter elements after discharging ink from the ink jet head.

34. The liquid crystal display apparatus according to claim 31, wherein said layer to be colored is divided into a plurality of rectangular filter elements, and each filter element is formed in a rectangular shape having shorter sides of 50 to 100 $\mu$m and longer sides of 150 to 450 $\mu$m.

35. An apparatus according to claim 34, wherein ink is discharged on different spots on said layer by incremental shifting.

36. An apparatus according to claim 34, wherein color mixing is not caused between adjacent filter elements after discharging ink from the ink jet head.

37. An apparatus comprising:
   a liquid crystal display device comprising a color filter formed by a method using an ink-jet head, the method comprising the steps of providing a transparent substrate having a layer to be colored thereon, the surface of said layer being substantially flat, and discharging an ink of a predetermined color to said layer for coloring said layer, wherein a numerical value d of a thickness in $\mu$m of said layer to be colored and a numerical value Vo of a volume in pl (pico-liter) of said ink to be discharged at one discharge is adjusted to establish d>Vo/500, and a second substrate opposing said color filter, wherein a liquid crystal compound is sealed between said transparent substrate and said second substrate; and
   image signal output means for outputting an image signal to said liquid crystal display device.

38. An apparatus according to claim 37, wherein ink is discharged on different spots on said layer by incremental shifting.

39. An apparatus according to claim 37, wherein said layer to be colored is divided into a plurality of filter elements, and color mixing is not caused between adjacent filter elements after discharging ink from the ink jet head.

40. The apparatus according to claim 37, wherein said layer to be colored is divided into a plurality of rectangular filter elements, and each filter element is formed in a rectangular shape having shorter sides of 50 to 100 $\mu$m and longer sides of 150 to 450 $\mu$m.

41. An apparatus according to claim 40, wherein ink is discharged on different spots on said layer by incremental shifting.

42. An apparatus according to claim 40, wherein color mixing is not caused between adjacent filter elements after discharging ink from the ink jet head.

* * * * *

UNITED STATES PATENT AND TRADEMARK OFFICE
CERTIFICATE OF CORRECTION

PATENT NO. : 6,025,898  
DATED : February 15, 2000  
INVENTOR(S) : Kashiwazaki et al.

Page 1 of 1

It is certified that error appears in the above-identified patent and that said Letters Patent is hereby corrected as shown below:

Title page, Item [54],  
Line 4, "D>VO/500" should read -- D>V/500 --.

Title page, Item [56],  
References Cited, FOREIGN PATENT DOCUMENTS, "1217320" should read -- 1-217320 --, and "4123005" should read -- 4-123005 --.

Column 1,  
Line 4, "D>VO/500" should read -- D>V/500 --.

Column 8,  
Line 56, "x" should read -- X --.

Column 16,  
Line 47, "claim 14," should read -- claim 17, --.

Signed and Sealed this

Twenty-third Day of October, 2001

Attest:

Nicholas P. Godici

NICHOLAS P. GODICI  
Attesting Officer   Acting Director of the United States Patent and Trademark Office